United States Patent [19]

D'Hont

[11] Patent Number: 5,373,303

[45] Date of Patent: Dec. 13, 1994

[54] BUILT-IN CHIP TRANSPONDER WITH ANTENNA COIL

[75] Inventor: Loek D'Hont, Almelo, Netherlands

[73] Assignee: Texas Instruments Incorporated, Dallas, Tex.

[21] Appl. No.: 993,333

[22] Filed: Dec. 18, 1992

[30] Foreign Application Priority Data

Dec. 30, 1991 [NL] Netherlands ............... 91203429.5

[51] Int. Cl.5 ............................................ H01Q 7/08
[52] U.S. Cl. ................................... 343/788; 340/505
[58] Field of Search ............. 343/787, 788, 742, 866, 343/867, 856; 340/505, 572, 825.54; H01Q 7/08

[56] References Cited

U.S. PATENT DOCUMENTS

| | | | |
|---|---|---|---|
| 3,440,633 | 4/1969 | Vinding | 340/572 |
| 4,429,314 | 1/1984 | Albright | 343/788 |
| 4,712,070 | 12/1987 | Clark et al. | 324/338 |
| 5,084,699 | 1/1992 | DeMichele | 343/742 |

Primary Examiner—Donald Hajec
Assistant Examiner—Tan Ho
Attorney, Agent, or Firm—Rebecca A. Mapstone; James C. Kesterson; Richard L. Donaldson

[57] ABSTRACT

An antenna circuit to be used in conjunction with a chip transponder such that the antenna circuit serves for both the reception of interrogative signals intended for the transponder as well as for response signals that ape to be transmitted by the transponder. The antenna circuit has at least one magnetic circuit of high $\mu$ material, and is formed of ceramic core means, that have been built into a depression in a thick-walled surface intended to receive the chip transponder. This thick-walled surface may be of metal. The ceramic core means comprise at least a ceramic core resonator and half a ceramic core that functions as an antenna with its open side facing outward. In one aspect, the ceramic core resonator and the half ceramic core antenna are coupled by means of one or more secondary coils of the closed ceramic core, which also form the coils of the half ceramic core antenna. In another aspect, the secondary coil forms a resonating circuit with at least one capacitive element in series. In yet another aspect, the ceramic core resonator and the half ceramic core antenna are formed by one and the same half ceramic core, which may be closed in part by a magnetic covering disk. In yet another aspect, the resonator may consist of a half ceramic core which is placed against the back of the half ceramic core antenna.

7 Claims, 2 Drawing Sheets

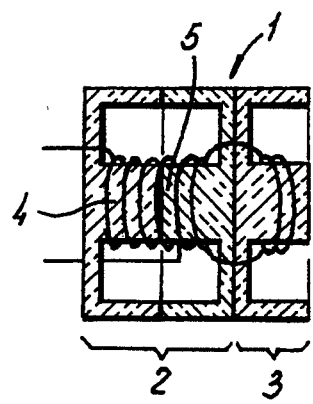
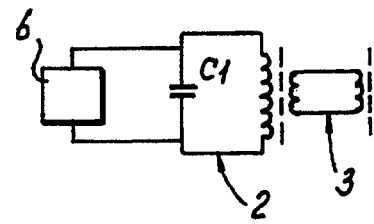
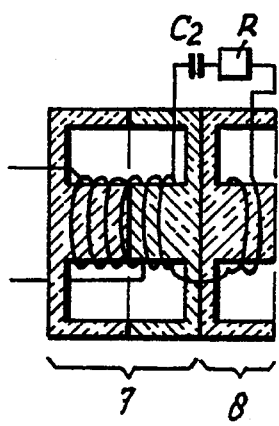
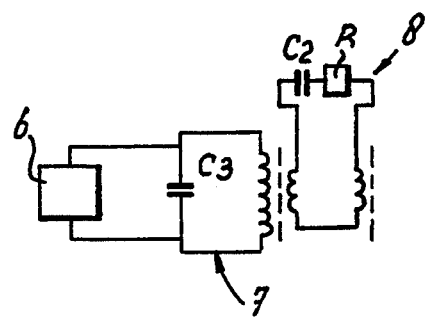
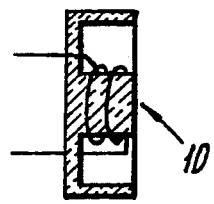
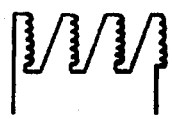

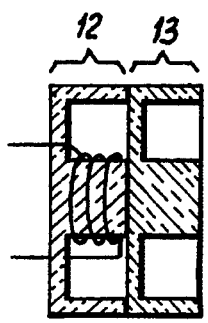
Fig-4a
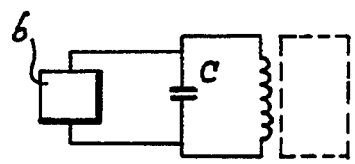
Fig-4b
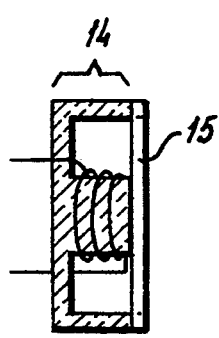
Fig-5a Fig-5b
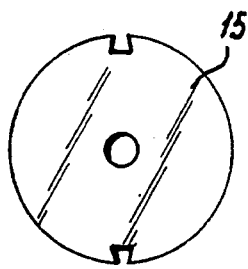
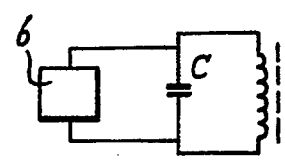
Fig-5c
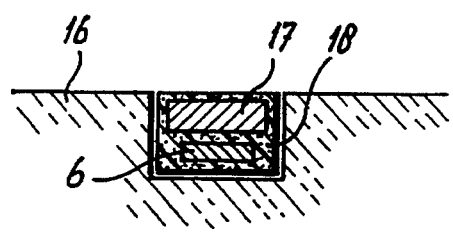
Fig-6

BUILT-IN CHIP TRANSPONDER WITH ANTENNA COIL

FIELD OF THE INVENTION

The invention refers to an antenna circuit to be used in a chip transponder such that the antenna circuit serves both for the reception of interrogative signals for the transponder as well as for the dissemination of response signals to be transmitted by the transponder such that the antenna circuit has at least one magnetic circuit of material of high $\mu$.

BACKGROUND OF THE INVENTION

In practice it is known that in order for a transponder chip to be embedded in or attached to an object or an animal that is to be identified, it must be equipped with an antenna circuit or antenna element of high $\mu$ material. Thus, a chip of this type is often equipped with a small Ferrite staff that serves as an antenna beacon. One disadvantage is the fact that such an antenna circuit does not have such a sharply defined field of radiation into space.

Similarly, such an embodiment does not lend itself well to incorporation into a thick-walled surface.

SUMMARY OF THE INVENTION

It is the goal of the present invention to create an antenna circuit for a chip transponder that is to be incorporated into a thick-walled surface that does not protrude and is thus little prone to damage from the outside due to crushing, one that has an effective field of radiation while retaining a high quality factor and sufficient selection difference.

This is achieved in the case of an antenna circuit of the sort named in the preface that conforms to the invention in such a way that the antenna circuit is formed of ceramic cores, which are built into a cavity in a thick-walled surface that is intended for the chip transponder, so that the field of radiation from the antenna circuit extends in a direction away from the surface. The surface is, for example, made of metal.

In this embodiment in keeping with the invention, a damage-resistant chip transponder that is built into a thick-walled surface and an antenna circuit are realized which, despite their incorporation into the metal, yield a high quality factor and adequate antenna properties. The selective distance in this case may be, for example, 20 to 30 cm.

BRIEF DESCRIPTION OF THE DRAWINGS

The invention will be illustrated in greater detail by virtue of a few examples of various embodiments, calling attention to the drawings, in which:

FIGS. 1a and 1b respectively present a transverse section view and an electrical diagram of the first embodiment in keeping with the invention;

FIGS. 2a and 2b respectively present a transverse section view and electrical diagram of a second embodiment in keeping with the invention;

FIGS. 3a, 3b, and 3c respectively present a transverse section view with a single turn, a transverse section view with the corresponding structure of a number of coil packets, and an electrical diagram of a third embodiment in keeping with the invention;

FIGS. 4a and 4b respectively present a transverse view and an electrical diagram of a fourth embodiment in keeping with the invention;

FIGS. 5a, 5b, and 5c respectively present a transverse view, a frontal view, and an electrical diagram of a fifth embodiment in keeping with the invention; and FIG. 6 presents a transverse view of a chip transponder built into a thick-walled metallic surface and the antenna coil thereunto appertaining.

DETAILED DESCRIPTION OF THE INVENTION

The incorporation of a chip transponder into a thick-walled metallic surface and a ceramic core as an antenna entails the problem that the quality factor which, in open space, may be 80, for example, is diminished to 60, for example, as a result of being built in. Such incorporation, therefore, must occur in such a way that the radiation field has sufficient scope and selective distance. Preferably, such a selective distance should be 20 to 30 cm.

This is realized in the embodiments that are illustrated in the following figures.

FIG. 1a shows a transverse view of an antenna circuit 1 that works in conjunction with the chip transponder, which circuit consists of a ceramic core resonator 2 and a ceramic core antenna 3. The resonator 2 is formed of a closed ceramic core that consists of two half ceramic cores 4, 5, from which a secondary coil (two windings) is connected with a half of a ceramic core that serves as an antenna. The resonator with the closed ceramic core can, despite the metallic environment, have a high Q, as a result of which the antenna which has the ceramic core can have a lower Q. As a result of the aforementioned loose connection, some energy is used for the radiation field. The quality factor on the primary side in the resonator remains sufficiently high. In FIG. 1b, it is shown that the primary coil in the resonator forms a resonant circuit with a capacitative element C1 in series. The resonator is connected to the chip transponder 6.

FIG. 2a shows a transverse section of a second embodiment. The secondary circuit is now embodied in such a way as to resonate with a capacitive element C2. In the equivalent diagram, which is shown in FIG. 2b, the frequency of the secondary antenna circuit 8 can be adjusted, for example, to the low side of the frequency band that is to be used, while the primary resonator 7 is then adjusted to its high side. In this embodiment, the coupling factor, determined by the number of coils and the resistor R, is chosen in such a way that a flat band curve is obtained for the transponder application.

In FIG. 3a, a transverse section of a third embodiment is shown, one with a so-called sliced-inductor packet 10. The resonator and the antenna are formed by one and the same half ceramic core. This embodiment has the best antenna properties with good scope of field and an appropriate selection distance. It is bothersome, however, to retain a good quality factor in this case. For the purpose of achieving this end, tinsel conductor, for example, may be used. At the same time, independent, flat, disk-shaped coil packets, as shown in FIG. 3b, may be used as coils in order to keep the capacity of the total assembly low, and, by these means, to retain a high quality factor of the resonator. The equivalent electrical diagram is shown in FIG. 3c.

In FIG. 4a, a transverse section view is presented of a fourth embodiment in which the resonator 12 that consists of having a ceramic core is placed with its open side against the antenna 13 that consists of half a ceramic core. In this embodiment, magnetic energy from the resonator is given off to the ceramic core antenna by way of the magnetic coupling. In FIG. 4b, once again, the equivalent electrical diagram is indicated.

In FIG. 5a, a transverse section view of a further embodiment is indicated, in which the ceramic core resonator and the ceramic core antenna are formed once again by one and the same ceramic core 14. This ceramic core is, in part, shut off on the outside by means of a covering disk 15, such as FIG. 5b indicates. The mechanism is such, in the meantime, that the resonator's field of distribution is used as the field of radiation due to the fact that the ceramic core has no ideal closed magnetic circuit. In FIG. 5c, once again, the equivalent electrical diagram is shown.

In FIG. 6, a transverse section view is presented of a transponder 6 with the appropriate resonator-antenna circuit 17. The whole is encapsulated in a packaging 18 and incorporated into a thick metallic wall 16. The antenna circuit may be executed as indicated in FIGS. 1 to 5.

I claim:

1. An antenna circuit to be used in conjunction with a chip transponder such that the antenna circuit serves for both the reception of interrogative signals intended for the transponder as well as for response signals that are to be transmitted by the transponder, comprising;

an antenna circuit, having at least one magnetic circuit of high permeability material, for radiating a magnetic field, comprising,
ceramic core means comprising at least a ceramic core resonator and half a ceramic core antenna, having an open side, which functions as an antenna with its open side facing outward, wherein said resonator and antenna are mutually coupled, one to the other, and
wherein the resonator consists of a closed ceramic core, and wherein the ceramic core resonator and half ceramic core antenna are coupled by means of at least one secondary coil of the closed ceramic core, which also form the coils of the half ceramic core antenna.

2. An antenna circuit to be used in conjunction with a chip transponder such that the antenna circuit serves for both the reception of interrogative signals intended for the transponder as well as for response signals that are to be transmitted by the transponer, comprising;

an antenna circuit, having at least one magnetic circuit of high permeability material, for radiating a magnetic field, comprising,
ceramic core means comprising at leas a ceramic core resonator and half a ceramic core antenna, having an open side, which functions as an antenna with its open side facing outward, wherein said resonator and antenna are mutually coupled, one to the other,
wherein the resonator consists of a closed ceramic core, and wherein the ceramic core resonator and half ceramic core antenna are coupled by means of at least one secondary coil of the closed ceramic core, which also form the coils of the half ceramic core antenna, and
wherein further said at least one secondary coil forms a resonating circuit with at least one capacitive element in series.

3. An antenna circuit in accordance with claim 2, wherein the resonant circuit is adjusted, with its frequency on the low side of the frequency band and the resonator on the high side of the frequency band.

4. An antenna circuit to be used in conjunction with a chip transponder such that the antenna circuit serves for both the reception of interrogative signals intended for the transponder as well as for response signals that are to be transmitted by the transponder, comprising;

an antenna circuit, having at least one magnetic circuit of high permeability material, for radiating a magnetic field, comprising,
ceramic core means comprising at least a ceramic core resonator and half a ceramic core antenna, having an open side, which functions as an antenna with its open side facing outward, wherein said resonator and antenna are mutually coupled, one to the other, and
wherein the ceramic core resonator and the half ceramic core antenna are formed by the same half ceramic core having one or more coils.

5. An antenna circuit to be used in conjunction with a chip transponder such that the antenna circuit serves for both the reception of interrogative signals intended for the transponder as well as for response signals that are to be transmitted by the transponder, comprising;

an antenna circuit, having at least one magnetic circuit of high permeability material, for radiating a magnetic field, comprising,
ceramic core means comprising at least a ceramic core resonator and half a ceramic core antenna, having an open side, which functions as an antenna with its open side facing outward, wherein said resonator and antenna are mutually, coupled one to the other,
wherein the ceramic core resonator and the half ceramic core antenna are formed by the same half ceramic core having one or more coils, and
wherein further the coils are formed as flat disk-shaped coils.

6. An antenna circuit to be used in conjunction with a chip transponder such that the antenna circuit serves for both the reception of interrogative signals intended for the transponder as well as for response signals that are to be transmitted by the transponder, comprising;

an antenna circuit, having at least one magnetic circuit of high permeability material, for radiating a magnetic field, comprising,
ceramic core means comprising at least a ceramic core resonator and half a ceramic core antenna, having an open side, which functions as an antenna with its open side facing outward, wherein said resonator and antenna are mutually coupled, one to the other,
wherein the ceramic core resonator and the half ceramic core antenna are formed by the same half ceramic core having one or more coils, and
wherein further said half ceramic core is closed in part by a magnetic covering disk.

7. An antenna circuit to be used in conjunction with a chip transponder such that the antenna circuit serves for both the reception of interrogative signals intended for the transponder as well as for response signals that are to be transmitted by the transponder, comprising;

an antenna circuit, having at least one magnetic circuit of high permeability material, for radiating a magnetic field, comprising,
ceramic core means comprising at least a ceramic core resonator and half a ceramic core antenna, having an open side, which functions as an antenna with its open side facing outward, wherein said resonator and antenna are mutually coupled, one to the other, and wherein the resonator consists of a half of a ceramic core which is abutting said half ceramic core antenna such that a portion of the magnetic energy from the resonator is transferred to the antenna via magnetic coupling.

* * * * *